Dec. 15, 1964  E. WEISE  3,161,181
PROCESS FOR RUNNING-IN INTERNAL COMBUSTION ENGINES
Filed May 17, 1963
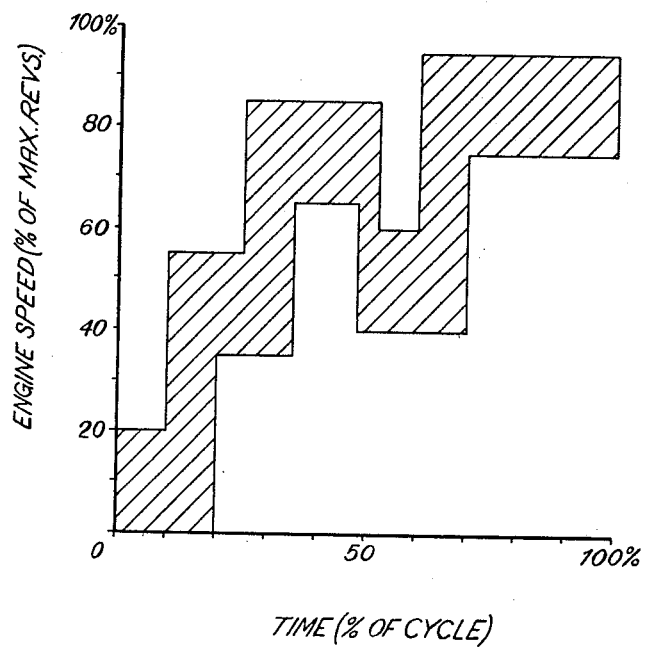
INVENTOR
ERICH WEISE
BY
Morgan, Finnegan, Durham & Pine
ATTORNEYS

United States Patent Office 3,161,181
Patented Dec. 15, 1964

3,161,181
PROCESS FOR RUNNING-IN INTERNAL COMBUSTION ENGINES
Erich Weise, Hamburg-Harburg, Germany, assignor to The British Petroleum Company Limited, London, England, a British joint-stock corporation
Filed May 17, 1963, Ser. No. 281,140
Claims priority, application Germany, May 25, 1962, B 67,401
10 Claims. (Cl. 123—1)

This invention relates to a process for running-in internal combustion engines. A running-in process comprises operating the engine to achieve good bedding of the piston rings against the cylinder wall; the performance of the process of my invention is completed when acceptable performance has been achieved. The usual criteria by which "acceptable performance" is recognised area:

(1) Power: As the running-in proceeds the power output increases. A minimum figure is often specified for the end of the process.

(2) Oil consumption: As the running-in proceeds the oil consumption falls. A maximum figure is often specified for the end of the process.

(3) Blow-by: Combustion gas may "blow by" the piston rings into the crank case. As the running-in proceeds the blow-by decreases; a maximum is sometimes specified for the end of the process.

It is to be understood that there is usually a small improvement in all three criteria after the running-in has been completed.

It is usual for most types of diesel engines, and some types of carburettor engines, to be run-in by the manufacturer and in such circumstances the running-in process is sometimes carried out with the aid of a running-in additive which may be added to the fuel, to the lubricant or to the air supply. The running-in additive may be an abrasive or it may be a material which is converted to an abrasive under the conditions which prevail in the cylinder. For example British patent specification 897,672 describes fuels which contain aluminum compounds, particularly poly-oxo-aluminium acylates. These acylates are not abrasives but it appears that on combustion in the cylinder they are converted into alumina which acts as an abrasive and thereby accelerates the running-in process.

In the past, a running-in process has comprised operating an engine with increasing speed and load until the desired run-in condition is achieved. This running-in process has been followed both with and without the use of running-in additives. It is an object of this invention to provide an improved method of utilising a running-in additive. Accordingly, the invention comprises a method of running-in an internal combustion engine, in which a running-in additive is introduced into the cylinders and the engine is operated without load throughout said introduction. Preferably the running-in process is carried out in one or more cycles, each cycle consisting of three phases as follows:

(1) An initial phase during which the speed of the engine is increased; preferably the speed at the end of the initial phase is from 60–90%, e.g. 65–85%, of the maximum engine speed. Preferably the initial phase ends after 30–50% of the time of the cycle has elapsed.

(2) A middle phase during which the speed of the engine is reduced; preferably the speed at the end of the middle phase is 40–60% of the maximum engine speed. Preferably the middle phase ends after 50–70% of the time of the cycle has elapsed.

(3) A final phase during which the speed is increased; preferably to at least 70% of the maximum speed.

Each cycle as described above may be of ½–3 hours' duration. Small engines are usually run-in at the end of the first cycle; larger engines may require several cycles.

The running-in cycle described above is illustrated graphically in the accompanying drawing in which the ordinate represents the engine speed (expressed as a percentage of the maximum) and the abscissa represents the elapsed time (expressed as a percentage of the duration of one cycle).

The process described may be carried out by operating an engine on a fuel which contains dissolved therein a poly-oxo aluminum acylate, preferably in a concentration of 1–10% by volume, the conditions of operation being as described above. Fuels of this type are described in British patent specification 897,672. Another method of running-in an engine according to the invention is by introducing an abrasive powder (Bon Ami Powder is particularly suitable) into the air intake.

The following comparative tests were carried out utilising running-in additives according to the invention.

Comparative Test 1

This test was carried out on a new, air cooled, four cylinder carburettor engine which had a swept volume of 1.6 litres and which developed 60 H.P. at 4500 r.p.m. This engine had not been run-in at the start of the test.

First the engine was run-in, without the use of a running-in additive, at an increasing speed and with an increasing load. This running-in process took 10 hours and afterwards the engine was found to be in the following condition:

| | Percent of the ring height run-in |
|---|---|
| Piston ring 1 | |
| Piston ring 2 | 30 |
| Piston ring 3 | 20 |
| | 20 |

The cylinder liner still showed clearly the honing grooves of manufacture. The engine developed 60.5 H.P. at 4500 r.p.m.

The engine was fitted with new piston rings, new cylinder linings and new bearings and run-in by operating the engine on a fuel which contained 2% by volume of a poly-oxo aluminium acylate; in accordance with the invention the engine was run without load throughout. The running-in was carried out in one cycle of one hour's duration; the cycle consisted of an initial phase during which the engine speed was increased, a middle phase during which the engine speed was decreased and a final phase during which the speed was increased. After this cycle the engine was found to be in the following condition:

| | Percent of the ring height run-in |
|---|---|
| Piston ring 1 | |
| Piston ring 2 | 40 |
| Piston ring 3 | 30 |
| | 30 |

Honing grooves were still visible, but the condition of the engine was better than in the case of the first test. The engine developed 61.4 H.P. at 4500 r.p.m.

Comparative Test 2

A single-cylinder, air-cooled, super-charged, diesel engine with a swept volume of 11.4 litres which developed 156 H.P. at 900 r.p.m. was fitted with a new cylinder and a new piston and run-in, without the use of a running-in additive, at increasing speed and increasing load. After 13 hours the engine was found to be in the following condition:

| | Percent of the ring height run-in |
|---|---|
| Piston ring 1 | |
| Piston ring 2 | 30 |
| Piston ring 3 | 20 |
| | 15 |

The maximum power developed was 156.0 H.P. at 900 r.p.m. and this was achieved with an oil consumption of 2.6 g. per H.P. per hour.

The engine was re-fitted with a new piston and cylinder and the engine was run-in according to the invention using a fuel which contained 3% by vol. of a poly-oxo aluminium acylate. The running-in was carried out in two cycles each lasting 1 hour. After these two cycles the engine was found to be in the following condition:

|  | Percent of the ring height run-in |
|---|---|
| Piston ring 1 | 50 |
| Piston ring 2 | 30 |
| Piston ring 3 | 20 |

The maximum power developed was 156.5 H.P. at 900 r.p.m. and this was achieved with an oil consumption of 2.6 g. per H.P. per hour.

The condition of the cylinder liners indicated that the second running-in procedure was more satisfactory. A chromed first piston ring was used during each test.

*Comparative Test 3*

An air cooled, two-cylinder, four stroke diesel engine of 0.8 litres swept volume which developed 15 H.P. at 2000 r.p.m. was run-in for 3 hours without a running-in additive. The state of the engine was found to be as follows:

Piston ring 1: 15% of the ring height run-in; 0.2–0.3μ average surface roughness.
Piston ring 2: 10% of the ring height run-in; 1.8–2.1μ average surface roughness.
Piston ring 3: 10% of the ring height run-in; 3.0–3.5μ average surface roughness.

The cylinder liner still showed honing grooves from manufacture. The engine developed a maximum power of 13.6 H.P. at 2500 r.p.m. and this was achieved with an oil consumption of 4.7 g. per H.P. per hour.

The engine was re-equipped with new piston rings, new pistons, and new cylinders. It was run-in according to the invention using a fuel which contained 8% by vol. of a poly-oxo aluminium acylate. The running-in was carried out in one cycle of 1 hour's duration as shown in the diagram and without load. The condition after this cycle was:

Piston ring 1: 50% of piston ring height run-in; 0.1–0.2μ average surface roughness.
Piston ring 2: 20% of the ring height run-in; 0.2–2.2μ average surface roughness.
Piston ring 3: 10% of the ring height run-in; 0.2–3.5μ average surface roughness.

The piston rings had a smooth contact surface without signs of the formation of grooves or burned points. Honing grooves could still be seen slightly in the cylinder liner. The maximum power developed was 15 H.P. at 2000 r.p.m. and this was achieved with an oil consumption of 1.8 per H.P. per hour.

I claim:

1. A method of running-in an internal combustion engine, in which a poly-oxo aluminium acylate is introduced into the cylinders of said engine, and throughout said introduction the engine is operated without load; the poly-oxo aluminium acylate being introduced into the cylinders of said engine by running the engine on a fuel in which it is dissolved.

2. A method according to claim 1, in which the running-in process is carried out in at least one cycle, each cycle consisting of three phases as follows:
   (1) an initial phase during which the speed of the engine is increased,
   (2) a middle phase during which the speed of the engine is reduced, and
   (3) a final phase during which the speed of the engine is increased.

3. A method according to claim 1, in which said fuel contains 1–10% by weight of the said poly-oxo aluminium acylate.

4. A method according to claim 2, in which the speed at the end of the initial phase is 60–90% of the maximum engine speed.

5. A method according to claim 4, in which the maximum speed at the end of the initial phase is 65–85% of the maximum engine speed.

6. A method according to claim 2, in which the initial phase ends after 30–50% of the time of the cycle has elapsed.

7. A method according to claim 2, in which the speed at the end of the middle phase is 40–60% of the maximum engine speed.

8. A method according to claim 2, in which the middle phase ends after 50–70% of the time of the cycle has elapsed.

9. A method according to claim 2, in which the speed at the end of the final phase is at least 70% of the maximum engine speed.

10. A method according to claim 2, in which the duration of each cycle is ½–3 hours.

References Cited by the Examiner

UNITED STATES PATENTS

| 2,364,990 | 12/44 | Malott | 123—1 |
| 3,050,379 | 8/62 | Bell et al. | 44—68 |

FOREIGN PATENTS 897,672   5/62   Great Britain.

RICHARD B. WILKINSON, *Primary Examiner.*

KARL J. ALBRECHT, *Examiner.*

UNITED STATES PATENT OFFICE
CERTIFICATE OF CORRECTION

Patent No. 3,161,181                December 15, 1964

Erich Weise

It is hereby certified that error appears in the above numbered patent requiring correction and that the said Letters Patent should read as corrected below.

Column 1, line 17, for "area" read -- are --; same column 1, line 40, and column 2, line 12, for "aluminum", each occurrence, read -- aluminium --.

Signed and sealed this 4th day of May 1965.

(SEAL)
Attest:

ERNEST W. SWIDER                EDWARD J. BRENNER
Attesting Officer                Commissioner of Patents